United States Patent
Matsudaira

(10) Patent No.: US 10,885,155 B2
(45) Date of Patent: Jan. 5, 2021

(54) SOFTWARE LICENSE MANAGEMENT SYSTEM AND MANAGEMENT METHOD

(71) Applicant: SHIMADZU CORPORATION, Kyoto (JP)

(72) Inventor: Atsushi Matsudaira, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 181 days.

(21) Appl. No.: 16/309,254

(22) PCT Filed: Jun. 15, 2016

(86) PCT No.: PCT/JP2016/067777
§ 371 (c)(1),
(2) Date: Dec. 12, 2018

(87) PCT Pub. No.: WO2017/216900
PCT Pub. Date: Dec. 21, 2017

(65) Prior Publication Data
US 2019/0147145 A1   May 16, 2019

(51) Int. Cl.
*G06F 21/10* (2013.01)
*G06F 8/65* (2018.01)

(52) U.S. Cl.
CPC .............. *G06F 21/105* (2013.01); *G06F 8/65* (2013.01); *G06F 2221/0753* (2013.01); *G06F 2221/0771* (2013.01)

(58) Field of Classification Search
CPC ........... G06F 21/105; G06F 2221/0771; G06F 2221/0753; G06F 8/65
(Continued)

(56) References Cited

U.S. PATENT DOCUMENTS

| 6,003,070 A | 12/1999 | Frantz |
| 6,502,127 B1 | 12/2002 | Edwards et al. |

(Continued)

FOREIGN PATENT DOCUMENTS

| JP | 2001-344034 A | 12/2001 |
| JP | 2003-58657 A | 2/2003 |

(Continued)

OTHER PUBLICATIONS

Communication dated Oct. 29, 2019, from the Japanese Patent Office in Application No. 2018-523101.
(Continued)

*Primary Examiner* — Kambiz Zand
*Assistant Examiner* — Benjamin A Kaplan
(74) *Attorney, Agent, or Firm* — Sughrue Mion, PLLC

(57) ABSTRACT

When upgrading a software installed in an analysis device PC (1) that is not connected to the Internet (4), a user performs a predetermined operation with the analysis device PC (1) to acquire a license authentication cancellation key. When the user accesses a server (5) from a user terminal (2) with a predetermined account and enters the license authentication cancellation key, a license authentication cancellation unit (52) cancels authentication of a license for a previous version. Furthermore, when the user enters a product serial number of an upgrade version software 3 and the like, an upgrade verification unit (53) confirms that the user owns the license for the previous version and that the authentication has been canceled, and an activation key issue unit (54) issues an activation key for an upgrade license. Using this, a device user activates the upgraded software installed in the analysis device PC (1). In this way, when upgrading the software on the offline PC, license authentication can be simply performed.

3 Claims, 2 Drawing Sheets

(58) Field of Classification Search
USPC .......................................................... 726/27
See application file for complete search history.

(56) References Cited

U.S. PATENT DOCUMENTS

| | | | |
|---|---|---|---|
| 6,944,776 B1 | 9/2005 | Lockhart et al. | |
| 7,805,377 B2 * | 9/2010 | Felsher | G06Q 20/3674 705/64 |
| 8,170,955 B2 * | 5/2012 | Stefik | H04N 21/83555 705/59 |
| 9,349,021 B1 * | 5/2016 | Chaganti | H04L 63/105 |
| 9,954,866 B2 | 4/2018 | Roth et al. | |
| 9,965,599 B2 * | 5/2018 | Komatsu | H04L 63/08 |
| 10,013,536 B2 | 7/2018 | Dean et al. | |
| 2003/0163808 A1 | 8/2003 | Cordova | |
| 2007/0050301 A1 | 3/2007 | Johnson | |
| 2007/0107067 A1 | 5/2007 | Fountian | |
| 2008/0313086 A1 | 12/2008 | Milgramm | |
| 2009/0037336 A1 | 2/2009 | Sunata | |
| 2009/0092253 A1 | 4/2009 | Asipov et al. | |
| 2009/0274304 A1 | 11/2009 | Kobayashi | |
| 2010/0037051 A1 | 2/2010 | Chang et al. | |
| 2012/0151504 A1 | 6/2012 | Schwalbe et al. | |
| 2013/0041933 A1 | 2/2013 | Lynn | |
| 2013/0218608 A1 | 8/2013 | Huson | |
| 2014/0014721 A1 | 1/2014 | Shima et al. | |
| 2014/0149516 A1 | 5/2014 | Paulraj | |
| 2016/0021118 A1 | 1/2016 | Roth et al. | |
| 2016/0065679 A1 | 3/2016 | Robertson | |
| 2016/0188903 A1 | 6/2016 | Webb et al. | |
| 2017/0078293 A1 | 3/2017 | Han | |
| 2017/0099246 A1 | 4/2017 | Ali et al. | |
| 2018/0219818 A1 | 8/2018 | Kramer et al. | |
| 2019/0163881 A1 | 5/2019 | Matsudaira | |
| 2019/0213602 A1 | 7/2019 | Hue et al. | |
| 2020/0099667 A1 | 3/2020 | Parthasarathy et al. | |

FOREIGN PATENT DOCUMENTS

| | | |
|---|---|---|
| JP | 2004-192099 A | 7/2004 |
| JP | 2008-021021 A | 1/2008 |
| JP | 2009-271680 A | 11/2009 |
| JP | 2014-32649 A | 2/2014 |

OTHER PUBLICATIONS

Written Opinion dated Aug. 30, 2016 in application No. PCT/JP2016/067778.
Written Opinion dated Sep. 20, 2016 in application No. PCT/JP2016/067777.
International Search Report for PCT/JP2016/067777 dated Sep. 20, 2016 (PCT/ISA/210).
"LabSolutions analysis data system ERES related regulatory compliance", [online], Shimadzu Corporation, [Search on Jun. 8, 2016].
Non Final Office Action dated Nov. 5, 2020 from the United States Patent and Trademark Office in U.S. Appl. No. 16/309,235.

* cited by examiner

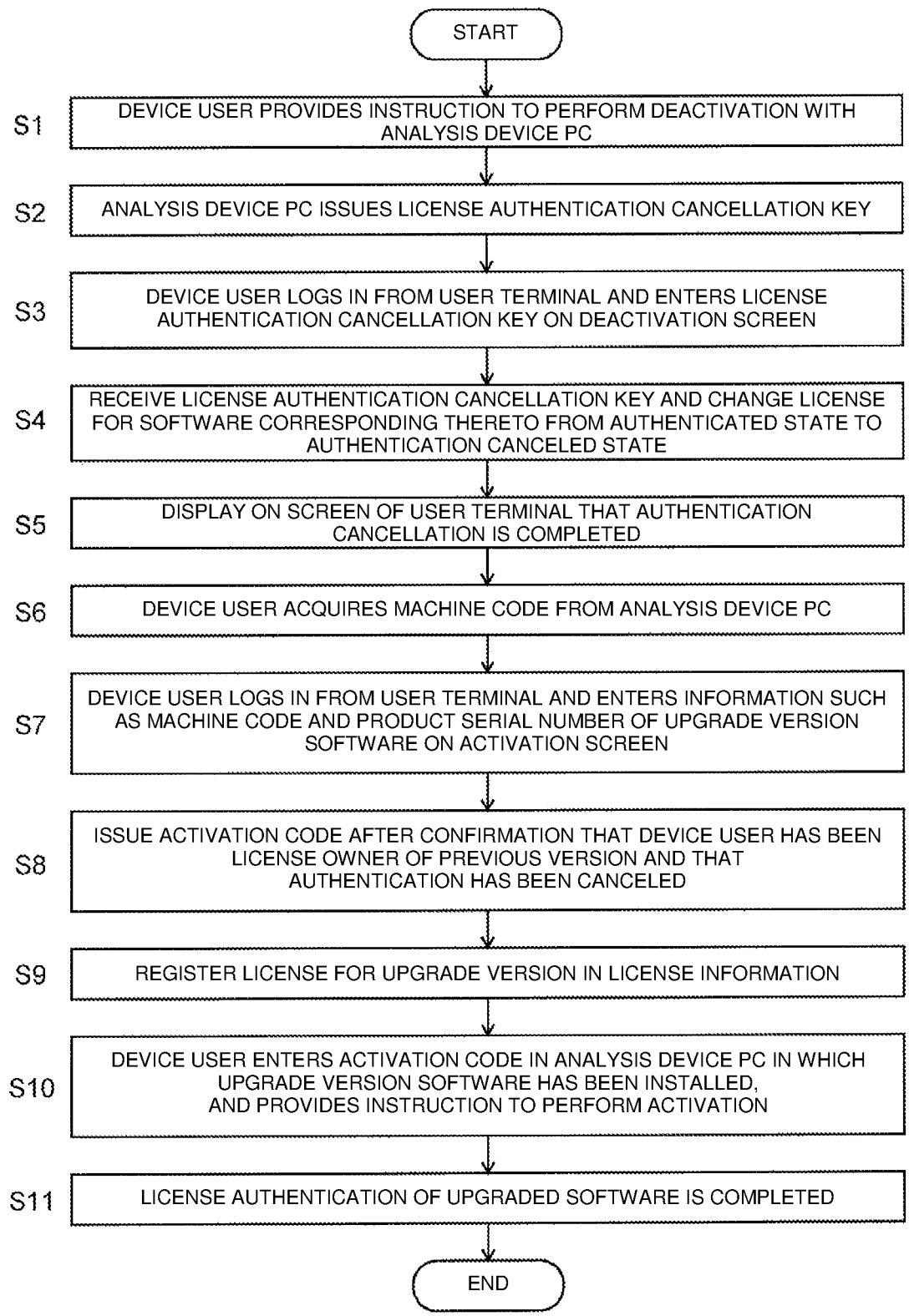

SOFTWARE LICENSE MANAGEMENT SYSTEM AND MANAGEMENT METHOD

CROSS REFERENCE TO RELATED APPLICATIONS

This application is a National Stage of International Application No. PCT/JP2016/067777 filed Jun. 15, 2016.

TECHNICAL FIELD

The present invention relates to a system and a method for managing a license of software installed in a computer, such as a personal computer, and in particular, to a software license management system and a management method suitable for license management of software installed in a computer in order to control various kinds of analysis devices or to process data obtained with the devices.

BACKGROUND ART

In recent years, personal computers (hereinafter abbreviated as "PC") in which dedicated softwares are installed have been widely used for control of analysis devices, such as a gas chromatograph, a liquid chromatograph, and a mass spectrometer, and for processing and management of various data obtained with these devices. As a method for preventing unauthorized use of software installed in a PC used in such a field, a license authentication method based on hardware such as a USB dongle has conventionally been the mainstream. Then, an electronic license authentication method for limiting use of software to a specified device (such as an analysis device and PC) by associating a license with the specified devices has recently become the mainstream. Such a license authentication method is generally referred to as an activation (refer to Patent Literature 1 and the like).

Generally, in an activation of a software for a PC or the like, in many cases, a system is constructed in which a license of software a user owns can be managed by a server or the like on the side of a manufacturer or a sales company of the software. When performing an online activation in such a system, the user first browses a predetermined Web page via the Internet from a PC in which software to be activated has been installed to create a user account on the Web page. Then, the user accesses the license management server by using the user account, and performs an activation, that is, license authentication. After the license authentication is finished, the software installed in the PC becomes usable. Usually, the above-described software installed in the PC that controls the analysis device or processes data acquired with the device also becomes usable only after license authentication.

Meanwhile, softwares installed in a PC or the like are often upgraded (updated) regularly or irregularly for purposes of addition of functions, improvement, and the like. Commercially available softwares mostly have restrictions that an upgrade version can be introduced only into a PC into which a previous version of the same software has been introduced. Therefore, when upgrading a software that has undergone license authentication, the user usually installs an upgrade version software in the PC on which an activation of a previous version software has been performed. Then, the user connects the PC to a server or the like of an upgrade version software supply source via the Internet and receives upgrade license authentication, and subsequently performs an online activation of the upgrade version software.

Recently, however, in order to prevent unauthorized access to a PC from the outside via the Internet or to prevent outflow of data via the Internet from the PC, connection of a PC to the Internet is sometimes restricted, that is, only off-line use of the PC is allowed. For example, in an analysing company which performs, under contract with various companies, government offices and the like, chemical analysis or physical analysis, a large number of PCs are used in order to control a large number of analysis devices or to quickly analyze a large amount of data obtained with these devices. Such PCs are not connected to the Internet in many cases for reasons of security. In such a PC, the above-described activation by the upgrade license via the Internet is difficult. Therefore, there is a problem that an upgrading of a software installed in a PC requires a complicated work such as, for example, making a request to a person in charge at a manufacturer, which is inefficient.

CITATION LIST

Patent Literature

Patent literature 1: JP 2008-21021 A

SUMMARY OF INVENTION

Technical Problem

The present invention has been made to solve the above-described problem, and an object of the invention is to provide a software license management system and a management method that can perform an activation using an upgrade license that comes with an upgrade version software when a software installed in a computer that is not connected to the Internet is to be upgraded.

Solution to Problem

A software license management system according to the present invention made for solving the above-described problem includes: a network; a first computer connected to the network, the first computer installed with a browser for browsing a Web page; a license management server connected to the network; and a second computer installed with a predetermined software, the second computer not being connected to the network, wherein the software license management system manages a license for the predetermined software of the second computer, the second computer includes:

a1) a license authentication cancellation key issue unit configured to issue a license authentication cancellation key for the predetermined software installed in the second computer in response to a predetermined operation; and a2) a license authentication unit configured to activate a software upgraded from the predetermined software, the software being newly installed into the second computer, in response to an entry of a license authentication key for an upgrade license to be described later, and the license management server includes:

b1) a license information storage unit configured to store an information that is capable of identifying the predetermined software and a license owner in association with each other;

b2) a license authentication cancellation unit configured to change the license for the predetermined software from an authenticated state to a canceled state in the license information storage unit in response to an entry of the license authentication cancellation key using a function of the browser of the first computer under an account of a user who is the license owner of the predetermined software;

b3) a determination unit configured to determine that the user is the license owner of the previous version of the predetermined software, and that the license is in the canceled state, based on the information stored in the license information storage unit, in response to an entry of an identification information of the upgraded software using the function of the browser of the first computer, under the account of the user who is the license owner of the predetermined software; and b4) an upgrade license authentication key issue unit configured to issue a license authentication key for an upgrade license and to notify the first computer based on a determination result made by the determination unit.

A software license management method according to the present invention made for solving the above-described problem includes: a network; a first computer connected to the network, the first computer installed with a browser for browsing a Web page; a license management server connected to the network; and a second computer installed with a predetermined software, the second computer not being connected to the network, wherein the software license management method includes managing a license for the predetermined software of the second computer, and the software license management method executes a series of processes in which:

the second computer issues a license authentication cancellation key for the predetermined software installed in the second computer in response to a predetermined operation, the license management server changes the license for the predetermined software from an authenticated state to a canceled state in a license information storage unit that stores an information that is capable of identifying the predetermined software and a license owner in association with each other, in response to an entry of the license authentication cancellation key using a function of the browser of the first computer under an account of a user who is the license owner of the predetermined software, subsequently, the license management server determines that the user is the license owner of a previous version of the predetermined software, and that the license is in the canceled state, based on the information stored in the license information storage unit, in response to an entry of an identification information of the software upgraded from the predetermined software, using the function of the browser of the first computer, under the account of the user who is the license owner of the predetermined software the license management server issues a license authentication key for an upgrade license and notifies the first computer based on a result of the determination, and the second computer activates the upgraded software newly installed into the second computer in response to an entry of the license authentication key for an upgrade license.

In the software license management system according to the present invention and a system to be used by the software license management method according to the present invention, the license management server may be one computer, or, alternatively, functions of the license management server may be divided and provided respectively in a plurality of computers. In addition, the network is normally the Internet, but may be a closed network such as an intranet. In addition, the first computer may be, besides a personal computer, an information terminal device on which a browser is installed, such as a so-called tablet terminal and a smartphone.

In the software license management system according to the present invention, the information that is capable of identifying the predetermined software and the information that is capable of identifying the license owner are stored in association with each other in the license information storage unit, where the information identifiable of the predetermined software is, for example, a product serial number of the software, and the information identifiable of the license owner is, for example, user account information.

In the software license management system according to the present invention, when upgrading the predetermined software installed in the second computer, the user who is a license owner of the software performs a predetermined operation with the second computer. In response to this operation, the license authentication cancellation key issue unit issues the license authentication cancellation key on the predetermined software, which is displayed on a screen of a display unit. The user accesses the license management server via the network by using the predetermined user account acquired from the first computer in advance, and enters the license authentication cancellation key acquired earlier. In the license management server, the license authentication cancellation unit refers to information stored in the license information storage unit. For example, the license authentication cancellation unit confirms whether the license authentication cancellation key corresponds to the software of which the user owns a license. Then, the license authentication cancellation unit changes the state of the license in the software to a canceled state.

Thereafter, when the user enters an identification information such as a product serial number of the software which is an upgrade version from the first computer under the predetermined user account, in the license management server, the determination unit determines whether the user is the owner of a license of the previous version of the predetermined software, and whether the license is in the canceled state, based on the information stored in the license information storage unit. When it is confirmed as a result of the determination that the user is an authorized user, the upgrade license authentication key issue unit issues a license authentication key for an upgrade license, and notifies the first computer via the network. Accordingly, since the user can acquire the license authentication key for the upgrade license, the user enters this license authentication key for the upgrade license with the second computer. In the second computer, in response to this entry, the license authentication unit performs an activation of the upgraded software about the predetermined software newly installed into the computer. The upgraded software becomes usable by this activation.

Note that the software license management system according to the present invention may have a configuration in which the license authentication unit of the second computer outputs a machine code for specifying the second computer in response to the predetermined operation, and the determination unit receives an entry of the machine code in addition to an entry of the identification information of the upgraded software under the account of the user who is the license owner of the predetermined software, and the determination unit also checks association between the machine code and the predetermined software.

With this configuration, when activating the upgraded software, it is also possible to verify association between the second computer into which the software is installed and the predetermined software of the previous version. This allows the license management server to find installation of inadequate software to another PC, copy of unauthorized software, and the like.

Advantageous Effects of Invention

According to the software license management system and the management method according to the present invention, when upgrading the software installed in the offline computer that is not connected to the Internet, the user himself or herself can simply perform license authentication of the upgrade version software by using another terminal connected to the Internet. This allows the user to save effort and time for a software upgrade. In addition, this allows a manufacturer or a sales company of the software to confirm whether the user owns the authorized license when the user upgrades the software, which is effective in preventing unauthorized use of the software and the like.

BRIEF DESCRIPTION OF DRAWINGS

FIG. 2 is a flowchart illustrating license authentication processing and a work procedure of an upgrade version software in the software license management system of the present embodiment.

DESCRIPTION OF EMBODIMENTS

Figure 1:
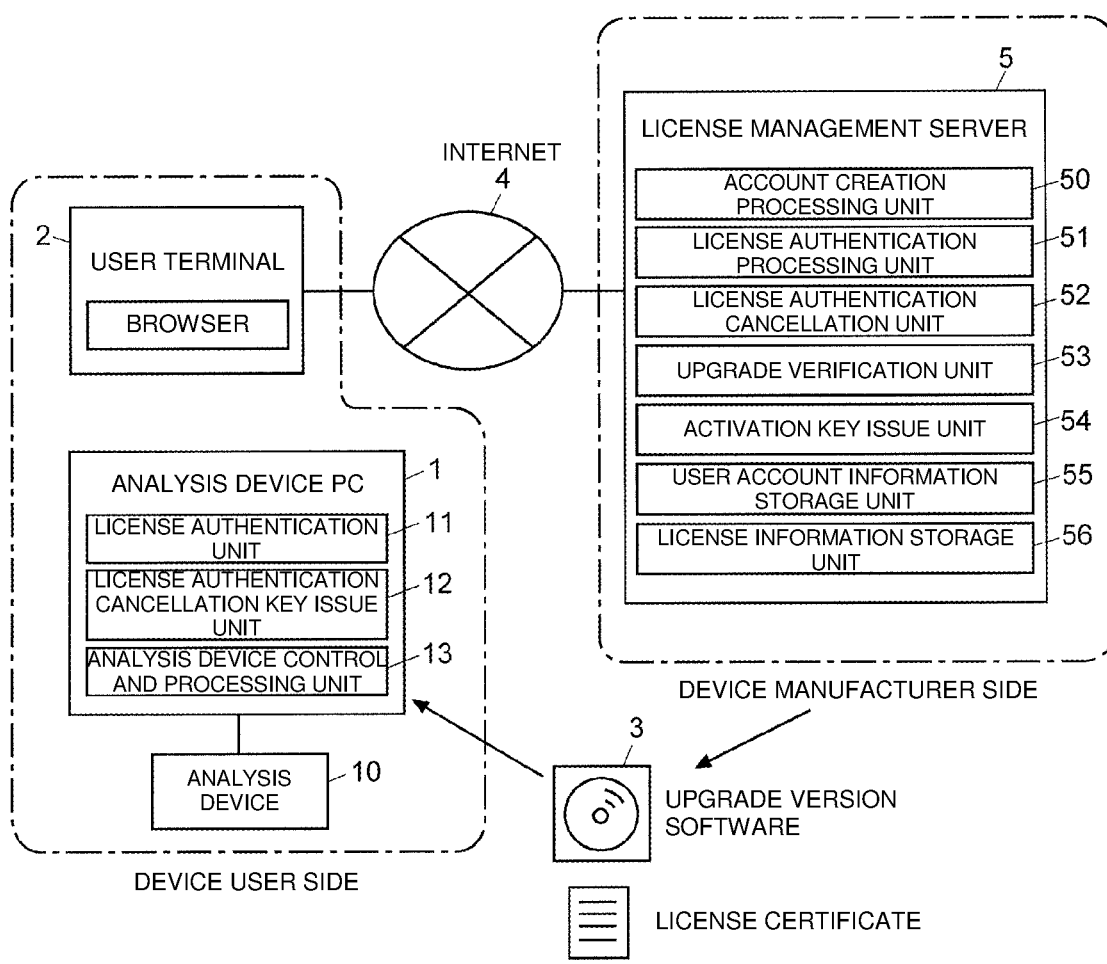
FIG. 1 is a schematic configuration diagram of one embodiment of a software license management system according to the present invention.

One embodiment of a software license management system according to the present invention will be described with reference to the accompanying drawings.

FIG. 1 is a schematic configuration diagram of the software license management system of the present embodiment. The software license management system of the present embodiment is a system that manages a license for a control and processing software installed in a PC connected to an analysis device such as a liquid chromatograph and a gas chromatograph, the PC being for controlling the analysis device or processing data obtained with the device.

The software license management system of the present embodiment includes an analysis device PC 1 connected to an analysis device 10 that performs predetermined analysis on a sample and collects measurement data, a license management server 5 that is actually a computer and is usually under management of a manufacturer of the analysis device 10 (or a seller of after-mentioned dedicated software installed in the analysis device PC 1 or the like), and a user terminal 2 such as a PC, a tablet terminal, and a smartphone owned by a device user of the analysis device 10 and the analysis device PC 1 (or in an environment where the device user can use the user terminal 2). The user terminal 2 and the license management server 5 are connected to the Internet 4 corresponding to a network in the present invention. Meanwhile, to avoid external invasion via the Internet 4 and to ensure high security, the analysis device PC 1 is not connectable to the Internet 4.

The dedicated control and processing software for controlling the analysis device 10 or processing data obtained with the analysis device 10 has been installed in the analysis device PC 1. As functional blocks to be embodied by executing the software on the PC 1, besides an analysis device control and processing unit 13, the analysis device PC 1 includes a license authentication unit 11 and a license authentication cancellation key issue unit 12. The user terminal 2 includes a browser standardly installed in a general PC or the like. In addition, as functional blocks to be embodied by executing on the computer a program installed in advance, the license management server 5 includes an account creation processing unit 50, a license authentication processing unit 51, a license authentication cancellation unit 52, an upgrade verification unit 53 corresponding to a determination unit in the present invention, an activation key issue unit 54 corresponding to an upgrade license authentication key issue unit in the present invention, a user account information storage unit 55, and a license information storage unit 56.

Account information such as a user name, a user ID, a password, and an email address is stored in the user account information storage unit 55 in order to identify a user who can use the license management server 5. Information for associating a product serial number of the control and processing software with the account information about a license owner, a state (status) of the latest license authentication regarding the software, and the like are stored in the license information storage unit 56. In addition, information that associates the product serial number of the software with a machine code that specifies the terminal is also stored in order to associate the software with a machine into which the software has been installed (terminal such as a PC).

Note that although one analysis device 10 is connected to one analysis device PC 1 in FIG. 1, a plurality of analysis devices may be connected to one analysis device PC 1. In that case, the plurality of analysis devices does not need to be the same type, and may be different types of analysis devices, for example, a liquid chromatograph, a gas chromatograph, a spectrophotometer, a mass spectrometer, and the like. In addition, needless to say, the license management server 5 intensively manages licenses of a large number of control and processing softwares.

When creating a user account in this system, the device user performs the following procedure. That is, the device user activates the browser with the user terminal 2 and accesses a predetermined address (URL). The license management server 5 receives this access via the Internet 4. The account creation processing unit 50 displays a login screen in which an account can be created on a display unit of the user terminal 2. The device user enters information such as a number of a license certificate given in advance (typically enclosed in a software product) together with the account information such as a user name, a password, and an email address, and then the device user requests account registration. In response to this request, the account creation processing unit 50 creates the user account for the device user, and stores the account information in the user account information storage unit 55.

Note that once the user account is registered, thereafter it is possible to log in to the license management server 5 by entering the user ID and the password on the login screen.

Now, it is assumed that the control and processing software installed in the analysis device PC 1 has been activated, that is, its license has been authenticated. In this state, the above-described product serial number of the control and processing software is associated with the account information of the device user in the license information storage unit 56 of the license management server 5, and the status of the license is an authenticated state. Note that the procedure of activating newly purchased software is basically similar to the procedure after step S6 in the flowchart illustrated in FIG. 2 to be described later.

As described above, when the control and processing software installed in the analysis device PC 1 has been activated, the software is usable, and functions of the analysis device control and processing unit 13 is implemented by operating the software on the analysis device PC 1. When a new function is added to such software or the software is improved, an upgrade version software is released. When the device user desires to upgrade the control and processing software already installed in the analysis device PC 1, the device user purchases a package of an upgrade version software 3, and makes this upgrade version software usable in the analysis device PC 1 by following the procedure below. FIG. 2 is a flowchart of the procedure at this time.

First, by performing a predetermined operation with the analysis device PC 1 before installing the upgrade version software 3, the device user provides an instruction to deactivate the previous version of the software (step S1). In response to this instruction, in the analysis device PC 1, the license authentication cancellation key issue unit 12 makes the previous version license unusable, issues the license authentication cancellation key, which is displayed on a screen of the display unit (step S2). The device user acquires the displayed license authentication cancellation key.

Subsequently, the device user accesses the predetermined address by using the browser with the user terminal 2 connected to the Internet 4, and logs in with the user account of the device user. Then, when a predetermined operation is performed, in the license management server 5 that has received this operation via the Internet 4, the license authentication cancellation unit 52 displays a deactivation screen including a license authentication cancellation key entry field on the display unit of the user terminal 2. On this screen, the device user enters the license authentication cancellation key acquired earlier and provides an instruction to perform license authentication cancellation (step S3).

In the license management server 5, the license authentication cancellation unit 52 confirms whether the entered license authentication cancellation key is an authorized one assigned to the control and processing software to be subjected to cancellation of license authentication. Then, the license authentication cancellation unit 52 changes the license status for the software stored in the license information storage unit 56 from an authenticated state to an authentication canceled state (step S4). Then, a message notifying that license authentication cancellation is completed is displayed on the screen of the display unit of the user terminal 2 (step S5). In this way, license authentication cancellation of the previous version software installed in the analysis device PC 1 is completed. Then, the device user continuously installs the upgrade version software 3 in the analysis device PC 1, and performs an activation on the software.

That is, when the device user performs a predetermined operation with the analysis device PC 1, the license authentication unit 11 displays the machine code registered in advance on the screen of the display unit, and the device user acquires the machine code (step S6). The machine code is a code for specifying the PC. Note that although the program that embodies the license authentication unit 11 is part of the control and processing software, the program itself operates regardless of whether the software has been activated. Therefore, even if the previous version has been deactivated, it is possible to perform work of step S6.

Next, the device user logs in to the license management server 5 by using the user account of the device user from the user terminal 2, and performs a predetermined operation. In response to this operation, the license authentication processing unit 51 of the license management server 5 displays an entry screen for an activation on the display unit of the user terminal 2. Then, on the entry screen for an activation, in addition to the machine code, the device user enters information such as the product serial number and a security code described in a license certificate enclosed in the upgrade version software 3 (step S7).

In the license management server 5, the upgrade verification unit 53 receives this entry information, and with reference to information stored in the license information storage unit 56, the upgrade verification unit 53 confirms that the device user who has logged in has been an owner of the previous version software before the upgrade version, that authentication of the software has been canceled, and that the machine code and the software correspond to each other. Then, when the confirmation is made, the activation key issue unit 54 issues an activation code for the upgrade license (license authentication key), and notifies the device user by displaying the activation code on the screen of the display unit of the user terminal 2 (step S8).

In addition, in parallel with issuing the activation code, the license authentication processing unit 51 registers the product serial number of the upgrade version software and the account of the device user in association with each other in the license information storage unit 56. In addition, the license authentication processing unit 51 stores information indicating that the status of the software is a license authenticated state (step S9).

When the device user obtains the activation code, it will be possible to perform an actual activation. That is, when the device user performs a predetermined operation with the analysis device PC 1, the license authentication unit 11 will display an activation code entry screen on the screen of the display unit. The device user enters the activation code on this screen, and provides an instruction to perform an activation (step S10). In response to this operation, the license authentication unit 11 checks the activation code. When the activation code is an authorized activation code, the license authentication unit 11 activates the installed upgraded control and processing software. When the license authentication is finished accordingly, the software will be in a usable state (step S11).

As described above, even when the analysis device PC 1 is offline, that is, not connected to the Internet 4, the software license management system of the present embodiment can simply activate the upgrade version software with the upgrade license by using a terminal such as another PC connected to the Internet 4.

Note that the above-described embodiment is only one example of the present invention, and it is apparent that the embodiment is included in the claims of this application even if modifications, additions, and alterations are made as appropriate within the spirit of the present invention.

REFERENCE SIGNS LIST

1 . . . Analysis Device PC
10 . . . Analysis Device
11 . . . License Authentication Unit
12 . . . License Authentication Cancellation Key Issue Unit
13 . . . Analysis Device Control and Processing Unit
2 . . . User Terminal
3 . . . Upgrade Version Software
4 . . . Internet
5 . . . License Management Server
50 . . . Account Creation Processing Unit
51 . . . License Authentication Processing Unit 52 . . . License Authentication Cancellation Unit
53 . . . Upgrade Verification Unit
54 . . . Activation Key Issue Unit
55 . . . User Account Information Storage Unit
56 . . . License Information Storage Unit

The invention claimed is:

1. A software license management system comprising:
a network;
a first computer connected to the network, the first computer installed with a browser for browsing a Web page;
a license management server connected to the network; and
a second computer installed with a predetermined software, the second computer not being connected to the network,
wherein the software license management system manages a license for the predetermined software of the second computer,
the second computer includes:
a1) a license authentication cancellation key issue unit configured to issue a license authentication cancellation key for the predetermined software installed in the second computer in response to a predetermined operation; and
a2) a license authentication unit configured to activate a software upgraded from the predetermined software, the software being newly installed into the second computer, in response to an entry of a license authentication key for an upgrade license to be described later, and
the license management server includes:
b1) a license information storage unit configured to store an information that is capable of identifying the predetermined software and a license owner in association with each other;
b2) a license authentication cancellation unit configured to change the license for the predetermined software from an authenticated state to a canceled state in the license information storage unit in response to an entry of the license authentication cancellation key using a function of the browser of the first computer under an account of a user who is the license owner of the predetermined software;
b3) a determination unit configured to determine that the user is the license owner of a previous version of the predetermined software, and that the license is in the canceled state, based on the information stored in the license information storage unit, in response to an entry of an identification information of the upgraded software using the function of the browser of the first computer, under the account of the user who is the license owner of the predetermined software; and
b4) an upgrade license authentication key issue unit configured to issue the license authentication key for an upgrade license and to notify the first computer based on a determination result made by the determination unit.

2. The software license management system according to claim 1, wherein
the license authentication unit of the second computer outputs a machine code for specifying the second computer in response to a predetermined operation, and
the determination unit receives an entry of the machine code in addition to the entry of the identification information of the upgraded software under the account of the user who is the license owner of the predetermined software, and the determination unit also determines association between the machine code and the predetermined software.

3. A software license management method comprising:
a network;
a first computer connected to the network, the first computer installed with a browser for browsing a Web page;
a license management server connected to the network; and
a second computer installed with a predetermined software, the second computer not being connected to the network,
wherein the software license management method includes managing a license for the predetermined software of the second computer, and
the software license management method executes a series of processes in which:
the second computer issues a license authentication cancellation key for the predetermined software installed in the second computer in response to a predetermined operation,
the license management server changes the license for the predetermined software from an authenticated state to a canceled state in a license information storage unit that stores an information that is capable of identifying the predetermined software and a license owner in association with each other, in response to an entry of the license authentication cancellation key using a function of the browser of the first computer under an account of a user who is the license owner of the predetermined software,
subsequently, the license management server determines that the user is the license owner of a previous version of the predetermined software, and that the license is in the canceled state, based on the information stored in the license information storage unit, in response to an entry of an identification information of a software upgraded from the predetermined software, using the function of the browser of the first computer, under the account of the user who is the license owner of the predetermined software
the license management server issues a license authentication key for an upgrade license and notifies the first computer based on a result of the determination, and
the second computer activates the upgraded software newly installed into the second computer in response to an entry of the license authentication key for an upgrade license.

* * * * *